(12) United States Patent  
Jung et al.

(10) Patent No.: US 9,107,102 B2  
(45) Date of Patent: Aug. 11, 2015

(54) METHOD AND APPARATUS FOR REPORTING A CELL QUALITY MEASUREMENT RESULT FOR MDT BY A TERMINAL

(75) Inventors: Sung Hoon Jung, Anyang-si (KR); Sung Duck Chun, Anyang-si (KR); Seung June Yi, Anyang-si (KR); Young Dae Lee, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 227 days.

(21) Appl. No.: 13/641,660

(22) PCT Filed: Apr. 27, 2011

(86) PCT No.: PCT/KR2011/003081  
§ 371 (c)(1),  
(2), (4) Date: Oct. 16, 2012

(87) PCT Pub. No.: WO2011/136557  
PCT Pub. Date: Nov. 3, 2011

(65) Prior Publication Data  
US 2013/0034013 A1  Feb. 7, 2013

Related U.S. Application Data

(60) Provisional application No. 61/329,072, filed on Apr. 28, 2010.

(51) Int. Cl.  
*H04W 36/08* (2009.01)  
*H04W 24/08* (2009.01)

(52) U.S. Cl.  
CPC .................... *H04W 24/08* (2013.01)

(58) Field of Classification Search  
USPC .................................. 370/252, 336  
See application file for complete search history.

(56) References Cited

U.S. PATENT DOCUMENTS

2005/0042987 A1  2/2005  Lee et al.  
2009/0036116 A1  2/2009  Kim et al.  
(Continued)

FOREIGN PATENT DOCUMENTS

| CN | 1839652 A | 9/2006 |
|---|---|---|
| CN | 101395828 A | 3/2009 |
| WO | WO 00/70897 A1 | 11/2000 |

OTHER PUBLICATIONS

3GPP, "3rd Generation Partnership Project; Technical Specification Group Radio Access Network; UE measurements for minimizing drive-tests in next generation networks; (Release 9)," 3GPP TSG-RAN WG2 meeting #65bis, R2-092030, Seoul, Korea, Mar. 23-27, 2009, 8 pages.

(Continued)

*Primary Examiner* — Dang Ton  
*Assistant Examiner* — Pamit Kaur  
(74) *Attorney, Agent, or Firm* — Birch, Stewart, Kolasch & Birch, LLP

(57) ABSTRACT

The present invention relates to a method and apparatus for reporting a cell quality measurement result for minimization of drive test (MDT) to a base station in an efficient manner by a terminal. The method for reporting a quality measurement result for MDT by a terminal according to one aspect of the present invention comprises: receiving from a base station a first message that contains logging configuration information of a quality measurement result for the MDT; performing quality measurement for the MDT and logging the quality measurement result according to logging configuration information contained in the first message; receiving from the base station a second message that contains information regarding whether the base station supports the report of the quality measurement result; and transmitting to the base station a message notifying the existence of the logged quality measurement result, if the second message contains the information regarding the support of the measurement result.

10 Claims, 7 Drawing Sheets

(56) References Cited

U.S. PATENT DOCUMENTS

2011/0201279 A1* 8/2011 Suzuki et al. .............. 455/67.11
2011/0201324 A1* 8/2011 Persson et al. ............. 455/422.1

OTHER PUBLICATIONS

ETSI MCC, "Draft Report of 3GPP TSG RAN WG2 meeting #65bis, Seoul, Korea, Mar. 23-27, 2009," TSG-RAN Working Group 2 meeting #66, R2-092721, San Francisco, USA, May 4-8, 2009, 127 pages.

Qualcomm Europe, "UE Measurements for Minimizing Drive Tests," 3GPP TSG-RAN WG2 meeting #65bis, R2-092029, Seoul, Korea, Mar. 23-27, 2009, 7 pages.

Ericsson et al., "Logged MDT measurement reporting", 3GPP TSG-RAN WG2 #69bis, R2-101994, Beijing, China, Apr. 12-16, 2010, 2 pages.

Ericsson, "Triggers for logged MDT measurement reporting", 3GPP TSG-RAN WG2 #69bis, R2-101995, Beijing, China, Apr. 12-16, 2010, 2 pages.

* cited by examiner

METHOD AND APPARATUS FOR REPORTING A CELL QUALITY MEASUREMENT RESULT FOR MDT BY A TERMINAL

This application is the National Phase of PCT/KR2011/003081 filed on Apr. 27, 2011, which claims priority under 35 U.S.C. 119(e) to U.S. Provisional Application No. 61/329,072 filed on Apr. 28, 2010, all of which are hereby expressly incorporated by reference into the present application.

TECHNICAL FIELD

The present invention relates to a method and apparatus for efficiently reporting a cell quality measurement result for minimization of drive test (MDT) to a base station.

BACKGROUND ART

As an example of a wireless communication system to which the present invention is applicable, a $3^{rd}$ Generation Partnership Project Long Term Evolution (3GPP LTE) communication system will be briefly described.

FIG. 1 is a view showing a network structure of an evolved universal terrestrial radio access network (E-UTRAN) which is an example of a mobile communication system. The E-UTRAN system is a system evolved from the existing UTRAN system and a basic standardization thereof is currently being performed in the 3GPP. The E-UTRAN system may be called a long term evolution (LTE) system.

The E-UTRAN includes eNBs (e-NodeBs or base stations) and eNBs are connected via an X2 interface. An eNB is connected to a user equipment (UE) via an air interface and is connected to an evolved packet core (EPC) via an S1 interface.

The EPC includes a mobility management entity (MME), a serving-gateway (S-GW) and a packet data network-gateway (PDN-GW). The MME has access information of a UE and information about capabilities of the UE. Such information is mainly used for mobility management of the UE. The S-GW is a gateway having an E-UTRAN as an end point and the PDN-GW is a gateway having a PDN as an end point.

Layers of a radio interface protocol between a UE and a network may be divided into a first layer (L1), a second layer (L2) and a third layer (L3) based on the three lower layers of an open system interconnection (OSI) standard model which is well-known in the art of communication systems. A physical layer, which is the first layer, provides an information transfer service by using a physical channel. A radio resource control (RRC) layer located at the third layer serves to control radio resources between a UE and a network. For control of radio resources, the RRC layer exchanges an RRC message between the UE and the network.

Although radio access technology has been developed to LTE based on WCDMA, the demands and expectations of users and providers have been lastingly increased. In addition, since other radio access technologies have been developed, new technological evolution is required for securing high competitiveness in the future. Decrease in cost per bit, increase in service availability, flexible use of a frequency band, simple structure, open interface, suitable UE power consumption and the like are required.

DISCLOSURE

Technical Problem

An object of the present invention is to provide a method of efficiently reporting a cell quality measurement result for minimization of drive test (MDT) at a user equipment (UE) in a state in which a base station requests MDT so as to prevent UE and radio resources from being wasted.

Technical Solution

The object of the present invention can be achieved by providing a method of reporting a quality measurement result for minimization of drive test (MDT) by a user equipment (UE), including receiving a first message including logging configuration information of the quality measurement result for MDT from a base station (BS), performing quality measurement for MDT and logging the quality measurement result according to the logging configuration information included in the first message, receiving a second message including information indicating whether the BS supports reporting of the quality measurement result from the BS, and transmitting, to the BS, a message indicating that the logged quality measurement result is present, if the second message includes information indicating that reporting of the quality measurement result is supported.

The second message may include one of information indicating that the BS supports reporting of the logged quality measurement result or information indicating that the BS does not support reporting of the logged quality measurement result.

The second message may be received via a UE-specific channel or via a broadcast channel.

The method may further include operating a predetermined first timer after logging the quality measurement result, and deleting the logged quality measurement result if the operated first timer has expired. The method may further include stopping operation of the first timer if the second message includes information indicating that reporting of the quality measurement result is not supported.

The method may further include, if a second message including information indicating that reporting of the quality measurement result is supported is further received after stopping operation of the first timer, transmitting, to the BS, a message indicating that the logged quality measurement result is present, and resuming operation of the first timer.

According to another aspect of the present invention, there is provided a method of reporting a quality measurement result for minimization of drive test (MDT) by a user equipment (UE), including receiving a first message including logging configuration information of the quality measurement result for MDT from a serving base station (BS), performing quality measurement for MDT and logging the quality measurement result according to the logging configuration information included in the first message, receiving a handover command message including information indicating whether a target BS supports reporting of the quality measurement result from the serving BS, and transmitting, to the target BS, a handover complete message including information indicating that the logged quality measurement result is present, if the handover command message includes information indicating that the target BS supports reporting of the quality measurement result.

At this time, the handover command message may include one of information indicating that the target BS supports reporting of the logged quality measurement result or information indicating that the target BS does not support reporting of the logged quality measurement result.

The method may further include operating a predetermined first timer after logging the quality measurement result, and deleting the logged quality measurement result if the operated first timer has expired. The method may further include stopping operation of the first timer if the handover command message includes information indicating that reporting of the quality measurement result is not supported.

The method may further include, if a message including information indicating that reporting of the quality measurement result is supported is further received from the target BS after stopping operation of the first timer, transmitting, to the target BS, a message indicating that the logged quality measurement result is present, and resuming operation of the first timer.

According to another aspect of the present invention, there is provided a user equipment (UE) for reporting a quality measurement result for minimization of drive test (MDT), including a reception module, a transmission module, and a processor configured to perform quality measurement for MDT if a first message including logging configuration information of the quality measurement result for MDT is received from a base station (BS) through the reception module and to log the quality measurement result according to the logging configuration information included in the first message, wherein the processor is further configured to receive a second message including information indicating whether the BS supports report of the quality measurement result from the BS through the reception module and transmit, to the BS, a message indicating that the logged quality measurement result is present, if the second message includes information indicating that reporting of the quality measurement result is supported.

According to another aspect of the present invention, there is provided a user equipment (UE) for reporting a quality measurement result for minimization of drive test (MDT), including a reception module, a transmission module, and a processor configured to perform quality measurement for MDT if a first message including logging configuration information of the quality measurement result for MDT is received from a serving base station (BS) through the reception module and to log the quality measurement result according to the logging configuration information included in the first message, wherein the processor is further configured to receive a handover command message including information indicating whether a target BS supports reporting of the quality measurement result from the serving BS through the reception module and transmits, to the BS, a handover complete message indicating that the logged quality measurement result is present through the transmission module, if the handover command message includes information indicating that the target BS supports reporting of the quality measurement result.

Advantageous Effects

According to the embodiments of the present invention, it is possible to prevent UE and radio resources from being wasted by reporting a cell quality measurement result for minimization of drive test (MDT) at a user equipment (UE) in a state in which a base station requests MDT, and to report the cell quality measurement result to the base station. Thus, a network can more efficiently optimize a service region.

BEST MODE

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out. For example, the following description will be made on the assumption of a 3GPP LTE system, but the present invention is applicable to various mobile communication systems to which an MDT measurement technique is applicable, such as an IEEE 802.16 system.

The following description includes details for the purpose of providing an understanding of the present invention. However, it will be apparent to those skilled in the art that these teachings may be implemented and practiced without these specific details. In some instances, well-known structures and devices are omitted in order to avoid obscuring the concepts of the present invention and the important functions of the structures and devices are shown in block diagram form. The same reference numbers will be used throughout the drawings to refer to the same or like parts.

As described above, hereinafter, a measurement control method for minimization of drive test (MDT) will be described.

Figure 1:
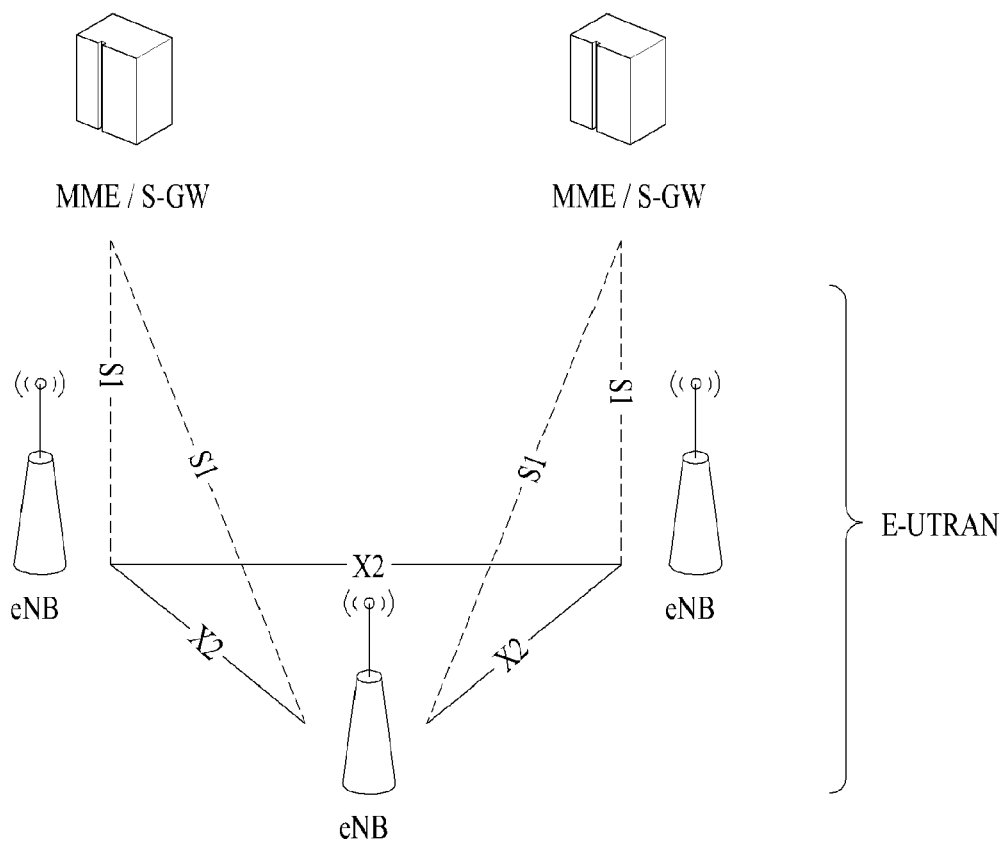
FIG. 1 is a diagram showing a network structure of an evolved universal terrestrial radio access network (E-UTRAN) which is an example of a mobile communication system.
Figure 2:
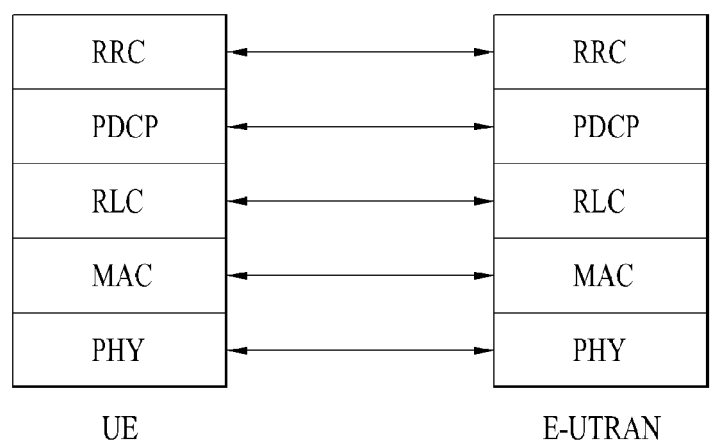
FIGS. 2 and 3 are diagrams showing the structure of a radio interface protocol between a user equipment (UE) and an E-UTRAN based on the 3GPP radio access network standard.
Figure 3:
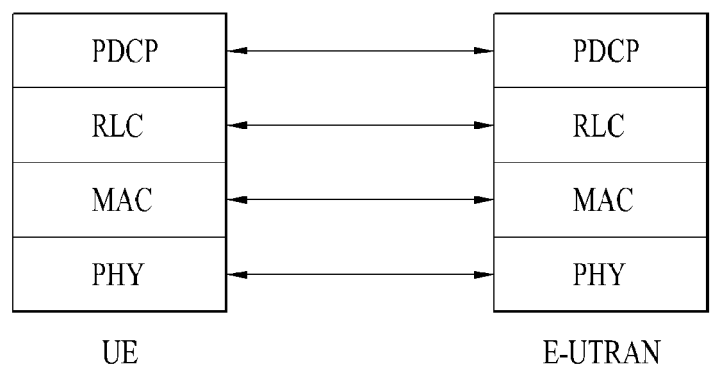

FIGS. 2 and 3 are diagrams showing the structure of a radio interface protocol between a user equipment (UE) and an E-UTRAN based on the 3GPP radio access network standard.

The radio interface protocol is horizontally composed of a physical layer, a data link layer, and a network layer, and is vertically composed of a user plane (U-plane) for transmitting user data and a control plane (C-plane) for transferring control signaling. The protocol layers of FIGS. 2 and 3 may be divided into L1 (Layer 1), L2 (Layer 2), and L3 (Layer 3) based upon the lower three layers of the Open System Interconnection (OSI) standard model that is widely known in the field of communication systems. A pair of radio protocol layers exists in a UE and an E-UTRAN so as to transfer data at a radio interval.

Hereinafter, the layers of the radio protocol control plane of FIG. 2 and the radio protocol user plane of FIG. 3 will be described.

A physical layer of a first layer provides an information transfer service to a higher layer using a physical channel. The physical layer is connected to a Medium Access Control (MAC) layer located on a higher layer via a transport channel. Data is transported between the MAC layer and the physical layer via the transport channel. Data is also transported between a physical layer of a transmitting side and a physical layer of a receiving side via a physical channel. The physical channel is modulated using an Orthogonal Frequency Division Multiple Access (OFDMA) scheme and uses a time and a frequency as radio resources.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. In this case, the RLC layer may not be present. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the top of a third layer is defined only in the control plane and is responsible for control of logical, transport, and physical channels in association with configuration, reconfiguration, and release of Radio Bearers (RBs). The RB is a service that the second layer provides for data communication between the UE and the network. The UE is in an RRC connected mode if an RRC connection has been established between the RRC layer of the radio network and the RRC layer of the UE. Otherwise, the UE is in an RRC idle mode.

Downlink transport channels for transmitting data from a network to a UE may include a Broadcast Channel (BCH) for transmitting system information and a downlink Shared Channel (SCH) for transmitting other user traffic or control messages. Traffic or control messages of a downlink multicast or broadcast service may be transmitted either via a downlink SCH, or via a separate downlink Multicast Channel (MCH). In addition, uplink transport channels for transmitting data from a terminal to a network may include a Random Access Channel (RACH) for transmitting an initial control message and an uplink Shared Channel (SCH) for transmitting user traffic or control messages.

Examples of a logical channel located above a transport channel and mapped to the transport channel include a broadcast channel (BCCH), a paging control channel (PCCH), a common control channel (CCCH), a multicast control channel (MCCH), a multicast traffic channel (MTCH), etc.

The physical channel includes several subframes located on a time axis and several subcarriers located on a frequency axis. One subframe includes a plurality of symbols on the time axis. One subframe includes a plurality of resource blocks and one resource block includes a plurality of symbols and a plurality of subcarriers. Each subframe may use specific subcarriers of specific symbols (e.g., a first symbol) of a subframe for a physical downlink control channel (PDCCH), that is, an L1/L2 control channel. One subframe may include two slots each having a length of 0.5 ms, which may correspond to 1 ms corresponding to a transmission time interval (TTI) for transmitting data.

Hereinafter, an RRC state of a UE and an RRC connection method will be described.

The RRC state indicates whether an RRC layer of a UE and an RRC layer of an E-UTRAN is logically connected, is referred to as an RRC_CONNECTED state if connected, and is referred to as an RRC_IDLE state if not connected. The E-UTRAN can confirm presence of a UE of the RRC_CONNECTED state in a cell unit and thus efficiently control the UE. In contrast, the E-UTRAN cannot confirm presence of a UE of the RRC_IDLE state and a core network manages the UE of the RRC_IDLE state in a tracking area unit which is greater than a cell. That is, only presence of the UE of the RRC_IDLE state is confirmed in a large region unit and the UE of the RRC_IDLE state should be switched to the RRC_CONNECTED state in order to receive a mobile communication service, such as voice or data.

When a user initially turns a UE on, the UE first searches for an appropriate cell and stays in an RRC_IDLE state in the cell. The UE which is in the RRC_IDLE state is RRC connected to the E-UTRAN via an RRC connection procedure so as to transition to the RRC_CONNECTED state. For example, if uplink data transmission is necessary due to call connection try of a user or if a response message is transmitted in response to a paging message received from the E-UTRAN, the UE which is in the idle state needs to be RRC connected to the E-UTRAN.

A non-access stratum (NAS) layer located above the RRC layer performs a function such as session management and mobility management.

In the NAS layer, two states such as an EPS mobility management-REGISTERED (EMM-REGISTERED) state and an EMM-DEREGISTERED state are defined in order to manage mobility of a UE. These two states are applied to the UE and the MME. An initial UE is in the EMM-DEREGISTERED state and performs a process of registering with a network through an initial attach procedure in order to be connected to the network. If the attach procedure is successfully performed, the UE and the MME enter the EMM-REGISTERED STATE.

In order to manage signaling connection between the UE and the EPC, an EPS connection management (ECM)-IDLE state and an ECM_CONNECTED state are defined and applied to the UE and the MME. If a UE in the ECM-IDLE state is RRC connected to the E-UTRAN, the UE enters the ECM-CONNECTED state. If the MME in the ECM-IDLE state is S1 connected to the E-UTRAN, the MME becomes the ECM-CONNECTED state. When the UE is in the ECM-IDLE state, the E-UTRAN does not have context information of the UE. Accordingly, the UE in the ECM-IDLE state performs a UE-based mobility associated procedure, such as cell selection or reselection, without receiving a command of the network. In contrast, if the UE is in the ECM-CONNECTED state, mobility of the UE is managed by the command of the network. If the location of the UE is changed in the ECM-IDLE state, the UE informs the network of the location thereof via a tracking area update procedure.

Hereinafter, system information will be described.

System information includes information necessary to enable a UE to access a base station (BS). Accordingly, the UE should receive all system information before accessing the BS. In addition, the UE should have recent system information. Since the system information should be known to all UEs in one cell, the BS periodically transmits the system information.

The system information is divided into a master information block (MIB), a scheduling block (SB), a system information block, etc. The MIB enables the UE to become aware of a physical configuration of a cell, e.g., a bandwidth. The SB informs the UE of transmission information of SIBs, e.g., a transmission period. The SIB is a set of associated system information. For example, a certain SIB includes only information about a neighboring cell and a certain SIB includes only information about an uplink radio channel used by the UE.

A service provided to the UE by the network may be divided into three types. The UE differently recognizes a cell type depending on which service may be received. In the following description, a service type will first be described and then a cell type will be described.

1) Limited service: This service provides an emergency call and an Earthquake and Tsunami Warning System (ETWS) and may be provided by an acceptable cell.

2) Normal service: This service means a public-use service and may be provided by a suitable cell.

3) Operator service: This service means a service for a communication network provider and this cell may be used only by the communication network provider and may not be used by a general user.

In association with the service type provided by the cell, the cell type is divided as follows.

1) Acceptable cell: Cell enabling a UE to receive a limited service. The UE is not barred from accessing this cell and this cell satisfies a cell selection criterion of the UE.

2) Suitable cell: Cell enabling a UE to receive a normal service. This cell satisfies the condition of the acceptable cell and, at the same time, satisfies additional conditions. As the additional conditions, this cell should belong to a public land mobile network (PLMN) accessible by the UE and should not inhibit the UE from performing a tracking area update procedure. If the cell is a CSG cell, the cell should enable the UE to access this cell as a CSG member.

3) Barred cell: Cell for broadcasting information indicating that the cell is a barred cell via system information.

4) Reserved cell: Cell for broadcasting information indicating that the cell is a reserved cell via system information.

Hereinafter, measurement and measurement report will be described.

In the following description, "measurement" indicates measurement of a quality value of a cell after receiving reference signals received from cells of inter-frequency, intra-frequency and inter-RAT by the UE according measurement setting received from the network. In the following description, "quality" refers to signal quality or cell quality checked through the reference signal received from a cell to be measured.

In association with mobility support of a UE in a mobile communication system, the UE continuously measures quality of a serving cell for currently providing a service and quality of a neighbor cell. The UE reports a cell quality measurement result to a network at an appropriate time and the network provides optimal mobility to the UE via handover, etc.

The UE performs measurement for a special purpose set by a network and reports a cell quality measurement result to the network, in order to provide information aiding a network provider in management of a network in addition to the purpose for supporting mobility. For example, the UE receives broadcast information of a specific cell decided by the network. The UE may report a cell identity (referred to as a global cell identifier) of the specific cell and identification (e.g., tracking area code) of a location of the specific cell and/or other cell information (e.g., a member/non-member of closed subscriber group (CSG) cell) to a serving cell.

If a moving UE confirms that quality of a specific region is bad through measurement, the UE may report location information of cells with bad quality and a cell quality measurement result to a network. The network may optimize the network based on reporting of the cell quality measurement result of the UEs which aid management of the network.

In a mobile communication system having a frequency reuse factor of 1, mobility is made between different cells of the same frequency band. Accordingly, in order to guarantee mobility of the UE, the UE should measure quality of neighboring cells having the same center frequency as the center frequency of a serving cell and cell information well. Measurement of a cell having the same center frequency as the center frequency of the serving cell is referred to as intra-frequency measurement. The UE performs intra-frequency measurement and reports a cell quality measurement result to a network at an appropriate time, thereby achieving the purpose of the cell quality measurement result.

A mobile communication provider may manage a network using a plurality of frequency bands. If a service of a communication system is provided through the plurality of frequency bands, in order to guarantee optimal mobility of a UE, the UE should measure quality of neighboring cells having a center frequency different from the center frequency of the serving cell and cell information well. Measurement of a cell having a center frequency different from the center frequency of the serving cell is referred to as inter-frequency measurement. The UE should perform inter-frequency measurement and report a cell quality measurement result to a network at an appropriate time.

If a UE supports measurement of a heterogeneous network, it is possible to measure a cell of the heterogeneous network by setting of a base station. Measurement of the heterogeneous network is referred to as inter-radio access technology (RAT) measurement. For example, RAT may include a UMTS terrestrial radio access network (UTRAN) which follows the 3GPP standard and a GSM EDGE radio access network (GERAN) and may also include a CDMA 2000 system which follows the 3GPP2 standard.

Hereinafter, a cell reselection process will be described.

After a UE selects any cell through a cell selection process, the strength or quality of a signal between the UE and a BS may be changed due to UE mobility or radio environment change. Accordingly, if the quality of the selected cell is deteriorated, the UE may select another cell for providing better quality. If the cell is reselected, a cell for providing quality better than that of a currently selected cell is selected. This process is referred to as cell reselection. The basic object of the cell reselection process is to select a cell for providing best quality to a UE from the viewpoint of quality of a radio signal.

In addition to quality of the radio signal, the network may inform the UE of a priority of each frequency. The UE which receives such priority preferentially considers the priority rather than the quality of the radio signal in a cell reselection process.

There is a method of selecting or reselecting a cell according to the signal property of a radio environment. In cell reselection, the following cell reselection methods may be used according to the frequency property and the RAT of the cell.

(1) Intra-frequency cell reselection: A cell having the same center frequency as the RAT of a cell which is being used by the UE is reselected.

(2) Inter-frequency cell reselection: A cell having a center frequency different from that of the RAT of a cell which is being used by the UE is reselected.

(3) Inter-RAT cell reselection: A cell which uses an RAT different from an RAT which is being used by the UE is reselected.

The cell reselection process will now be described.

First, a UE receives parameter values for cell reselection from a BS.

Second, the UE measures quality of a serving cell and a neighboring cell for cell reselection.

Third, cell reselection is performed based on a cell reselection criterion.

The cell reselection criterion has the following characteristics in association with serving cell and neighboring cell measurement.

(1) Intra-frequency cell reselection is fundamentally based on ranking. Ranking defines an index value for cell reselection evaluation and ranks cells in the order of index values. A cell having a best index is referred to as a best ranked cell. The cell index value is obtained by applying a frequency offset or a cell offset to a measurement value of a cell measured by the UE as necessary.

(2) Inter-frequency cell reselection is based on a frequency priority provided by a network. A UE attempts to camp on a frequency having a highest frequency priority. The network may provide a common frequency-specific priority to UEs in a cell through broadcast signaling or provide a frequency-specific priority to each UE through dedicated signaling.

(3) For inter-frequency cell reselection, a network may provide a parameter used for cell reselection (e.g., a frequency-specific offset) to a UE according to frequency.

(4) For intra-frequency cell reselection or inter-frequency cell reselection, a network may provide a neighboring cell list (NCL) used for cell reselection to a UE. This NCL includes a cell-specific parameter (e.g., a cell-specific offset) used for cell reselection.

(5) For intra-frequency or inter-frequency cell reselection, a network may provide a cell reselection black list used for cell reselection to a UE. A UE does not perform cell reselection with respect to a cell included in the black list.

Hereinafter, ranking performed in a cell reselection evaluation process will be described.

A ranking criterion used to prioritize a cell is defined in Equation 1.

$$Rs = Q\text{meas},s + Q\text{hyst}, Rn = Q\text{meas},n\ Q\text{offset}\qquad\text{Equation 1}$$

where, Rs denotes a ranking criterion of a serving cell, Rn denotes a ranking criterion of a neighboring cell, Qmeas,s denotes a quality value of the serving cell measured by a UE, Qmeas,n denotes a quality value of the neighboring cell measured by the UE, Qhyst denotes a hysteresis value for ranking, and Qoffset is an offset between two cells.

In intra-frequency, if the UE receives the offset Qoffsets,n between the serving cell and the neighboring cell, Qoffoset=Qoffsets,n and, if the UE does not receive Qoffsets,n, Qoffset=0.

In inter-frequency, if the UE receives the offset Qoffsets,n of the cell, Qoffoset=Qoffsets,n+Qfrequency and, if the UE does not receive Qoffsets,n, Qoffset=Qfrequency.

If the ranking criterion RS of the serving cell and the ranking criterion Rn of the neighboring cell are changed in a similar state, ranking is frequently changed according to the change result and thus the UE may alternately reselect the two cells. Qhyst is a parameter for providing hysteresis in cell reselection so as to prevent the UE from alternately reselecting the two cells.

The UE measures RS of the serving cell and Rn of the neighboring cell according to Equation 1, regards a cell having a highest ranking index value as a best ranked cell, and reselects this cell.

According to the above criterion, cell quality is a most important criterion in cell reselection. If the reselected cell is not a suitable cell, the UE excludes a corresponding frequency or a corresponding cell from the cell reselection target.

Next, a method of performing measurement while minimizing power consumption of a UE in association with cell reselection will be described.

A UE measures a neighboring cell, in order to determine whether a neighboring cell better than a serving cell is present and access the cell if such neighboring cell is present. However, regular measurement of the neighboring cell may cause power consumption of the UE. Accordingly, a method of omitting measurement of the neighboring cell if the quality of the serving cell is sufficiently good so as to reduce power consumption of the UE may be considered. In order to more efficiently use power of the UE, in LTE, the quality of the serving cell is compared with a threshold and the measurement of the neighboring cell is omitted if the quality of the serving cell is higher than the threshold.

More specifically, the network may set two kinds of thresholds with respect to the UE. These thresholds may be set by system information.

A first threshold is called Sintrasearch. If the quality of the serving cell is superior to Sintrasearch, the UE may omit measurement of a neighboring cell having the same frequency as the serving cell. This threshold may be included in cell reselection information transmitted by the BS. If the cell reselection information does not include Sintrasearch, the UE may not omit measurement of the neighboring cell having the same frequency as the serving cell.

A second threshold is called Snon-intrasearch. If the quality of the serving cell is superior to Son-intrasearch, the UE may omit measurement of the neighboring cell having a frequency different from that of the serving cell. This threshold may be included in cell reselection information. If the cell reselection information does not include Snon-intrasearch, the UE may not omit measurement of the neighboring cell having the frequency different from that of the serving cell.

Figure 4:
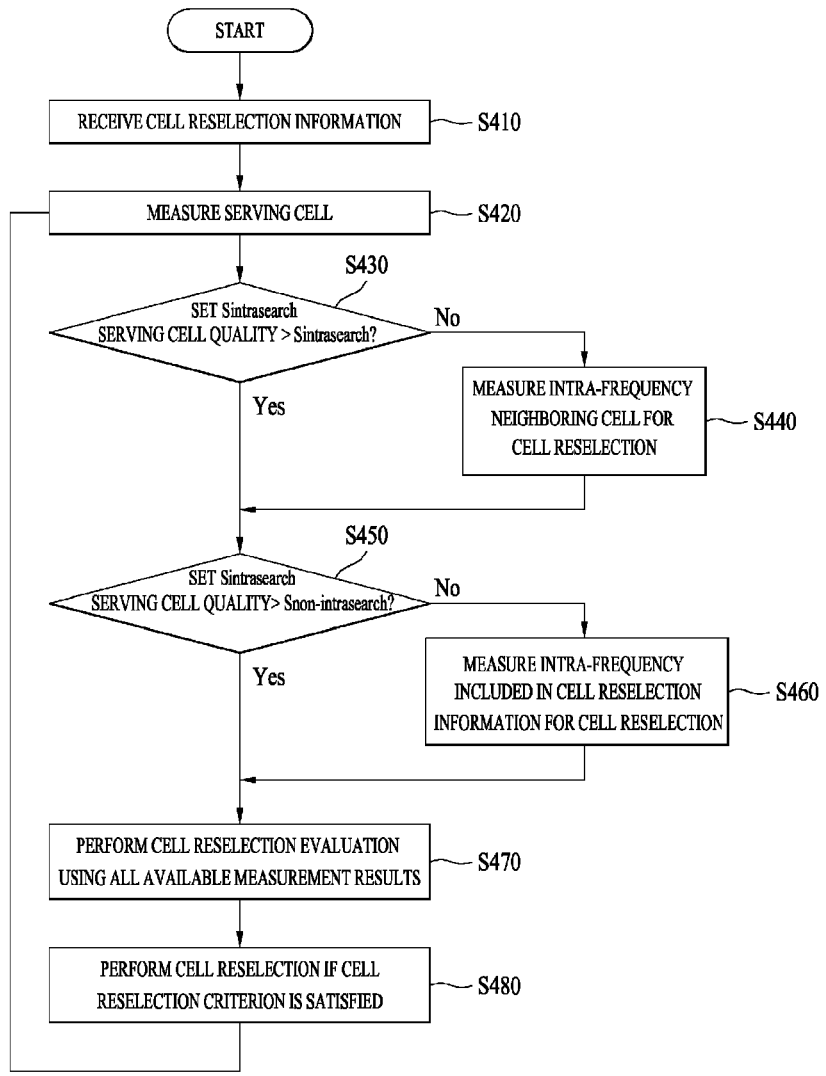
FIG. 4 is a flowchart illustrating a measurement method for cell reselection.

FIG. 4 is a flowchart illustrating a cell reselection procedure of a UE considering efficient power measurement.

The flow of the cell reselection procedure will be described with reference to the drawing. First, the UE receives cell reselection information (S410). The cell reselection information may include a measurement frequency associated with quality measurement for cell reselection. The cell reselection information may further include frequency information of a serving cell of the UE and an intra frequency measurement frequency for cell reselection measurement.

The UE measures the serving cell and measures the quality of the serving cell (S420). In association with the measured quality of the serving cell, the UE sets Sintrasearch which is the first threshold and determines whether the quality of the serving cell exceeds Sintrasearch (S430). If the quality of the serving cell exceeds Sintrasearch, the UE may omit intra-frequency measurement. If the quality of the serving cell does not exceed Sintrasearch, the UE may perform intra-frequency measurement for cell reselection (S440).

Thereafter, the UE sets Snon-intrasearch in association with the quality of the serving cell and determines whether the quality of the serving cell exceeds Snon-intrasearch (S450). If the quality of the serving cell exceeds Snon-intrasearch, the UE may omit inter-frequency measurement. If the quality of the serving cell does not exceed Snon-intrasearch, the UE may perform inter-frequency measurement for cell reselection (S460).

The UE performs cell reselection evaluation using all available measurement results (S470). Thereafter, if the cell reselection criterion is satisfied, the UE performs cell reselection (S480).

Through such a procedure, the UE may omit measurement if the quality of the serving cell is sufficiently good and perform a cell reselection operation.

Next, a minimization of drive test (MDT) scheme will be described.

MDT indicates that a provider measures the quality of a cell using a vehicle for cell coverage optimization. Instead of a conventional method of performing a drive test, MDT may enable UEs which exist in a cell to perform measurement and to report the results. Accordingly, it is possible to generate a cell coverage map and minimize time and costs consumed for optimizing a network.

MDT includes Logged MDT and immediate MDT.

Logged MDT refers to a method of performing MDT measurement at a UE, logging data, and sending the data to a network at a specific time. Immediate MDT refers to a method of performing MDT measurement and immediately sending data to a network. These methods are different in that, while the result measured by the UE is immediately reported to the eNB in the logged MDT, the result measured by the UE is logged and is reported to the eNB later in the immediate MDT. In particular, in case of an RRC_IDLE UE, RRC connection is not established and thus the cell quality measurement result may not be immediately reported. Accordingly, in this case, logged MDT is used.

In order to perform logged MDT, the UE may receive a message including a logging configuration for MDT measurement from the cell.

The logged MDT configuration received by the UE may include a triggering configuration for event logging, an MDT configuration duration, an MDT area configuration, etc.

The UE immediately starts a timer for the MDT configuration duration when the logging configuration for logged MDT measurement is received. The UE logs the measurement value of the logged MDT in an RRC_IDLE state only while the duration timer operates. If the duration timer has expired, the UE deletes the MDT configuration. However, the UE maintains the logged cell quality measurement result for MDT during a predetermined time (e.g., 48 hours) and has an opportunity to report the MDT measurement value logged during this time to the cell.

The value measured for MDT is the quality of a cell on which the UE camps, which is measured by reference signal received power (RSRP) and reference signal received quality (RSRQ). If the logged MDT is set in the UE, the UE measures and logs the quality of the cell in an RRC_IDLE mode and reports the MDT measurement value to the network later.

A provider collects the MDT measurement values received from the several UEs, makes a coverage map indicating service quality distribution and information indicating whether the provider can provide a service over the entire area, and use the coverage map to manage and optimize the network. For example, when the provider receives a coverage problem of a specific region from a UE, the provider may increase transmit power of the BS for providing the service of the region and extend the coverage of the cell of the region.

Although the cell quality measurement result for MDT may be used interchangeably with a log, a UE log value, a measurement value, a cell quality measurement result, etc., hereinafter, the cell quality measurement result for MDT is used for clarity of the specification.

If the UE performs measurement for MDT and logs the cell quality measurement result for MDT, the UE informs the network that the cell quality measurement result for MDT is logged upon RRC connection establishment through an RRC connection setup complete message. The network which receives information indicating that the cell quality measurement result for MDT is logged from the UE sends a command for transmitting the logged cell quality measurement result for MDT to the UE and the UE transmits the logged cell quality measurement result for MDT to the network in response to the command. In addition to RRC connection establishment, even upon RRC connection re-establishment, the UE may inform the network that the cell quality measurement result for MDT is logged through an RRC connection re-establishment complete message.

In addition, if a UE performs handover from a serving cell to a target cell, the UE may inform the target cell that the cell quality measurement result for MDT is logged through an RRC reconfiguration complete message.

If the UE desires to report the logged cell quality measurement result for the MDT to the cell, if a specific cell is already busy providing services to UEs other than the UE which transmits the cell quality measurement result for MDT, if reception of the cell quality measurement result for MDT is not supported, or if a cell is indifferent to network optimization through reception of the cell quality measurement result for MDT, the cell may not wish to receive the cell quality measurement result for MDT to be transmitted by the UE.

However, conventionally, once the MDT is set in the UE, if the cell quality measurement result for MDT is logged, the UE attempts to report the logged quality measurement result for MDT regardless of whether the cell may receive the quality measurement result for MDT or the cell wishes to receive the quality measurement result for MDT.

Accordingly, a method of transmitting MDT information at the UE only when the cell wishes to receive the quality measurement result for MDT is necessary.

In addition, when the MDT duration has expired, the UE starts the duration timer of the logged quality measurement result for MDT regardless of whether the cell on which the UE camps may receive the quality measurement result for MDT. As a result, if the duration timer has expired and the UE does not obtain an opportunity to transmit the logged quality measurement result for MDT until a predetermined time (e.g., 48 hours) for continuously logging the quality measurement result for MDT has elapsed, the UE deletes the logged quality measurement result for MDT. However, the UE preferably deletes the logged quality measurement result for MDT only when the cell does not wish to receive the logged quality measurement result for MDT, due to lack of radio resources or the like.

Accordingly, the UE determines whether the cell supports reception of the quality measurement result for MDT or wishes to receive the quality measurement result for MDT, does not delete the logged quality measurement result and continuously holds the logged quality measurement result in the UE if the cell wishes to receive the quality measurement result for MDT but may not receive the quality measurement result for MDT for some reasons, and obtains an opportunity to report the quality measurement result for MDT later.

In order to solve such a problem, the present invention provides a method of efficiently reporting the quality measurement result for MDT at a UE in a state in which a cell requests MDT so as to prevent UE and radio resources from being wasted.

More specifically, the present invention provides a method of, at a UE, receiving a message including information indicating whether a BS supports reporting of a quality measurement result from the BS and transmitting, to the BS, a message indicating that the logged quality measurement result is present only when the received message includes information indicating that the BS supports reporting of the quality measurement result.

Hereinafter, for convenience of description, the present invention will be described on the assumption that information indicating whether the BS supports reporting of the quality measurement result includes any one of an indicator indicating that the quality measurement result for MDT logged by the UE is received or an indicator indicating that the logged quality measurement result is not received. The present invention is not limited thereto and various implementations are possible.

Figure 5:
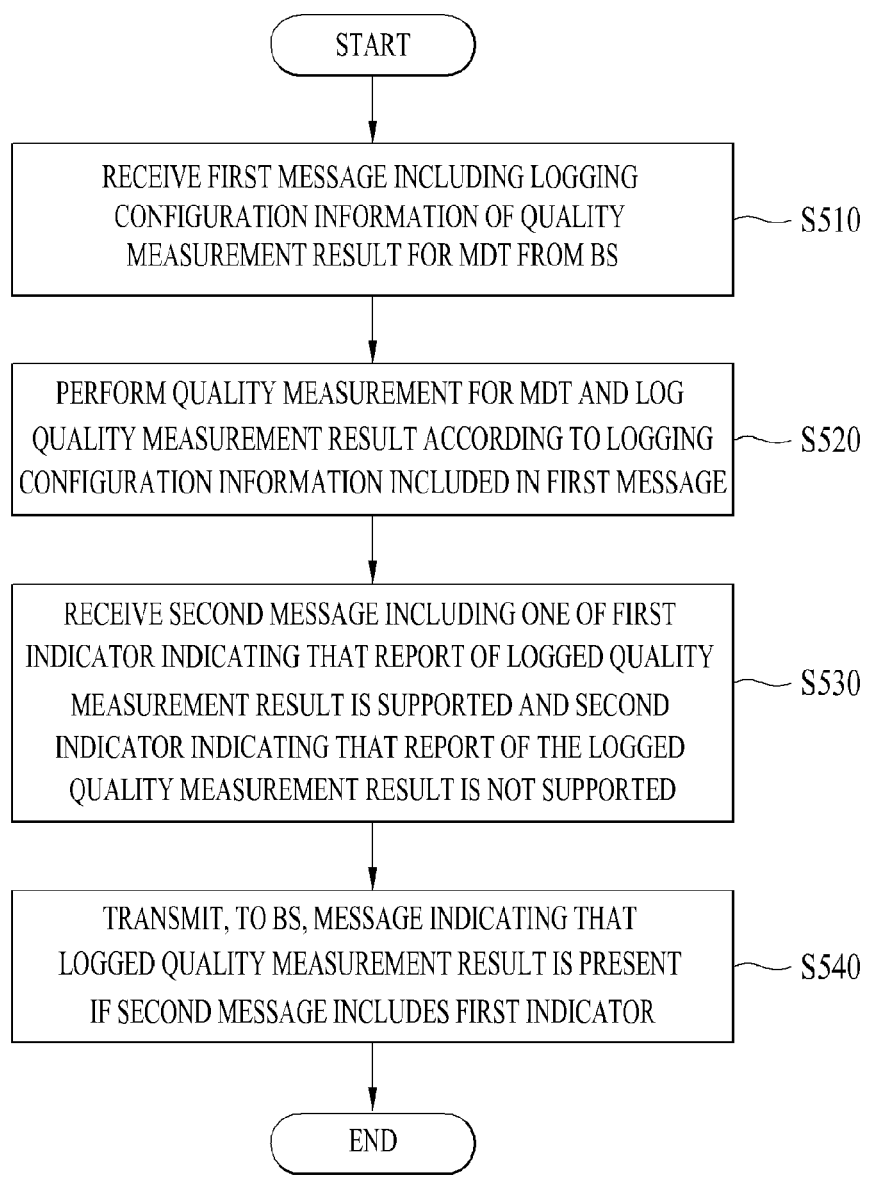
FIG. 5 is a flowchart illustrating a process of reporting a cell quality measurement result to a base station only when a UE receives a message including an indicator indicating that a cell quality measurement result for minimization of drive test (MDT) is received.

FIG. 5 is a flowchart illustrating a process of reporting a quality measurement result to a BS only when a UE receives a message including an indicator indicating that a quality measurement result for MDT is received.

A process of reporting the quality measurement result for MDT to a cell will be described with reference to FIG. 5.

First, the UE may receive a message including a logging configuration of measurement for MDT from the BS (S510).

The logging configuration of measurement for MDT may include a triggering configuration for event logging, an MDT configuration duration, an MDT area configuration, etc.

Hereinafter, for convenience of description, a message including a logging configuration of measurement for MDT is referred to as a first message.

Thereafter, the UE performs measurement for MDT and logs a cell quality measurement result according to the logging configuration included in the first message (S520).

The UE does not immediately inform the BS that the logged MDT cell quality measurement result is present and waits for the message indicating whether or not the BS wishes to receive the cell quality measurement result.

Thereafter, the UE may receive, from the BS, a message including one of an indicator indicating that the logged quality measurement result for MDT is received if the logged quality measurement result for MDT is present or an indicator indicating that the logged quality measurement result for MDT is not received (S530).

Hereinafter, for convenience of description, the indicator indicating that the logged quality measurement result for MDT is received is referred to as a first indicator and the indicator indicating that the logged quality measurement result for MDT is not received is referred to as a second indicator. A message including one of the first indicator or the second indicator is referred to as a second message.

At this time, the second message may be a dedicated message received via a dedicated channel. The UE may receive the second message via the dedicated channel allocated to the connected UE in a state in which RRC connection with the BS is established. The message which may be received via the dedicated channel includes a message including new indication of the BS, a message for releasing RRC connection, etc. and may include the second message. In addition, the second message may be a broadcast message.

If the second message is received, the UE determines whether the second message includes the first indicator.

If the second message includes the first indicator, the UE transmits, to the BS, a message indicating that the measurement result for MDT is logged (S540) and, if the second message includes the second indicator, the UE does not transmit, to the BS, the message indicating that the MDT measurement result is logged.

Table 1 shows the first indicator or the second indicator which may be included in the second message.

TABLE 1

|  | Value 1 = Support MDT report | Value 1 = Suppress MDT report | Value 1 = Support MDT report, Value 2 = Suppress MDT report | Value 1 = Support MDT report, Value 2 = Suppress MDT report |
|---|---|---|---|---|
| Absence | Suppress MDT report | Support MDT report | Support MDT report | Suppress MDT report |
| Presence with the value set to Value1 | Support MDT report | Suppress MDT report | Support MDT report | Support MDT report |
| Presence 2 with the value set to Value 2 | N/A | N/A | Suppress MDT report | Suppress MDT report |

As shown in Table 1, if the second message includes the first indicator, the UE transmits, to the BS, the message indicating that the MDT measurement result is logged and, if the second message includes the second indicator, the UE does not transmit, to the BS, the message indicating the MDT measurement result is logged.

Accordingly, the UE reports the quality measurement result for MDT only in a state in which the cell requests MDT so as to prevent UE and radio resources from being wasted and to accurately transmit the cell quality measurement result for MDT to the cell.

This will be described in more detail with reference to FIG. 6.

Figure 6:
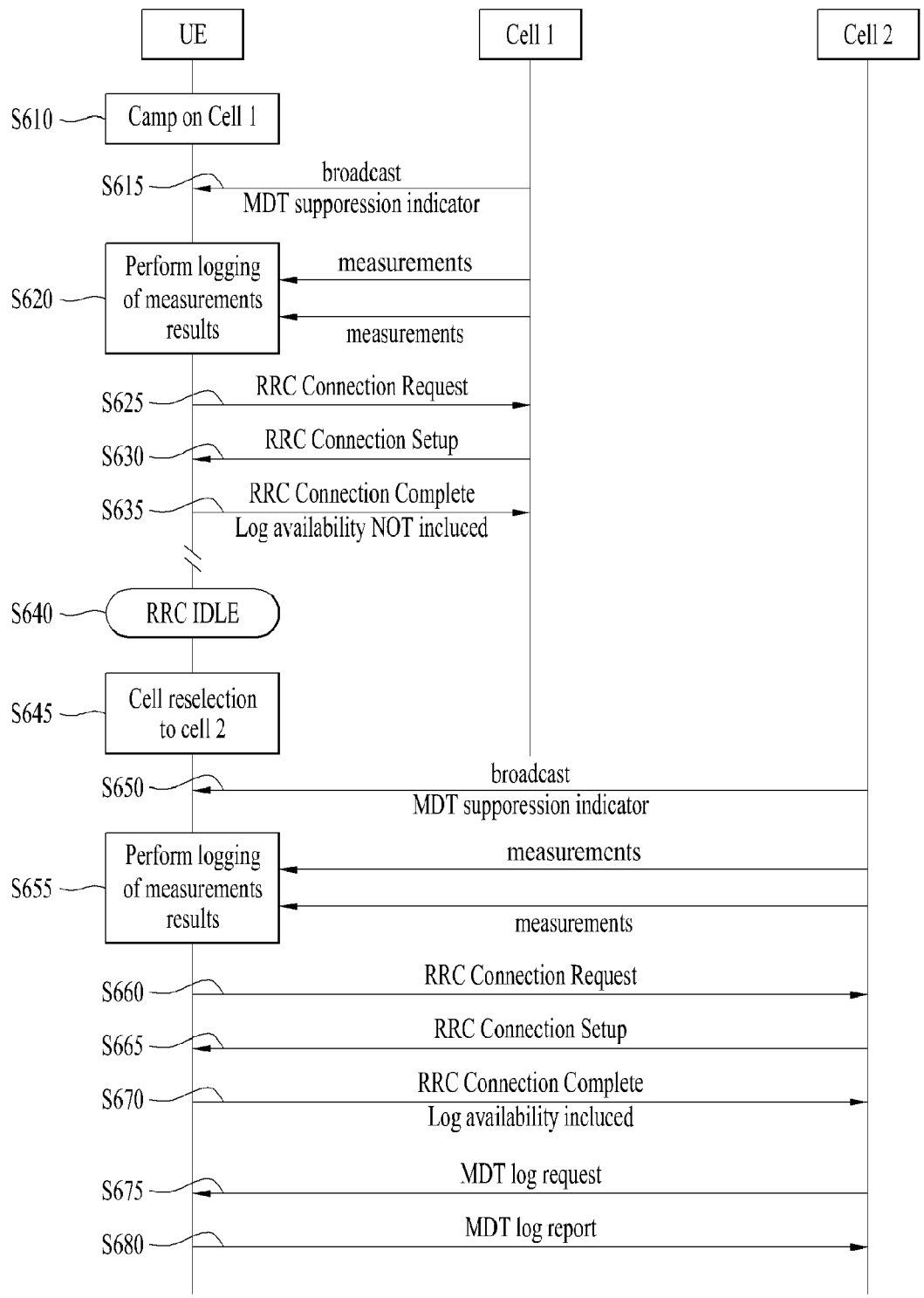
FIG. 6 is a diagram showing an example of reporting a cell quality measurement result to a base station only when a UE receives a message including an indicator indicating that a cell quality measurement result for minimization of drive test (MDT) is received, according to an embodiment of the present invention.

FIG. 6 is a diagram showing an example of reporting a cell quality measurement result for MDT to a BS only when a UE receives a message including an indicator indicating that the cell quality measurement result is received, according to an embodiment of the present invention.

Referring to FIG. 6, first, the UE may camp on a cell 1 (S610). At this time, the UE may receive the second message including the second indicator from the cell 1 (S615).

The UE performs measurement for MDT and logs a cell quality measurement result (S620).

Thereafter, if the UE transmits an RRC connection request to the cell 1 (S625), the UE may receive RRC connection setup from the cell 1 (S630).

In this case, the UE does not inform the cell 1 that the cell quality measurement result for MDT is logged while transmitting RRC connection complete to the cell 1 (S635).

The UE may enter an RRC IDLE mode (S640), reselect a cell 2 (S645) and receive the second message including the first message from the cell 2 (S650).

The UE performs measurement for MDT and logs the cell quality measurement result (S655).

Thereafter, the UE may transmit an RRC connection request to the cell (S660) and receive RRC connection setup from the cell 2 (S665).

In this case, the UE informs the cell 2 that the cell quality measurement result for MDT is logged while transmitting RRC connection complete to the cell 2 (S670).

When the UE receives a request for reporting the cell quality measurement result for MDT from the cell 2 (S675), the UE transmits the logged cell quality measurement result to the cell 2.

Accordingly, it is possible to efficiently report the quality measurement result for MDT depending on which of the first indicator or the second indicator is included in the second message.

According to the embodiment of the present invention, it is possible to provide a method of operating a predetermined timer after logging the quality measurement result and stopping the operation of the timer when the UE receives the second message including the second indicator although and the logged quality measurement result is set to be deleted when the timer has elapsed.

The conventional UE starts the timer for deciding the duration associated with logging of the quality measurement result for MDT regardless of whether the cell on which the UE currently camps receives the quality measurement result for MDT. As a result, if the UE does not obtain an opportunity to transmit the quality measurement result for MDT before the duration timer elapses, the UE deletes the logged quality measurement result for MDT. However, the UE deletes the logged quality measurement result for MDT only when the cell does not wish to receive the logged quality measurement result for MDT, due to lack of radio resource or the like.

Accordingly, in the present invention, by stopping the operation of the timer for deciding the duration for logging the quality measurement result if the second message including the second indicator is received from the cell and so as to continuously hold the logged quality measurement result, it is possible guarantee an opportunity to report the logged quality measurement result later.

Further, if the UE further receives the second message including the first indicator after the operation of the timer is stopped, it is possible to transmit, to the cell, the message indicating that the logged quality measurement result is present and to resume the stopped operation of the timer.

In addition, according to another embodiment of the present invention, if the UE performs handover from the serving BS to the target BS, there may be provided a method of informing the target BS that the logged quality measurement result is present only when, between the first indicator indicating that the target BS receives the quality measurement result for MDT or the second indicator indicating that the target BS does not receive the logged quality measurement result, the first indicator is included in the handover command message received from the serving BS.

This will be described in more detail with reference to FIG. 7.

Figure 7:
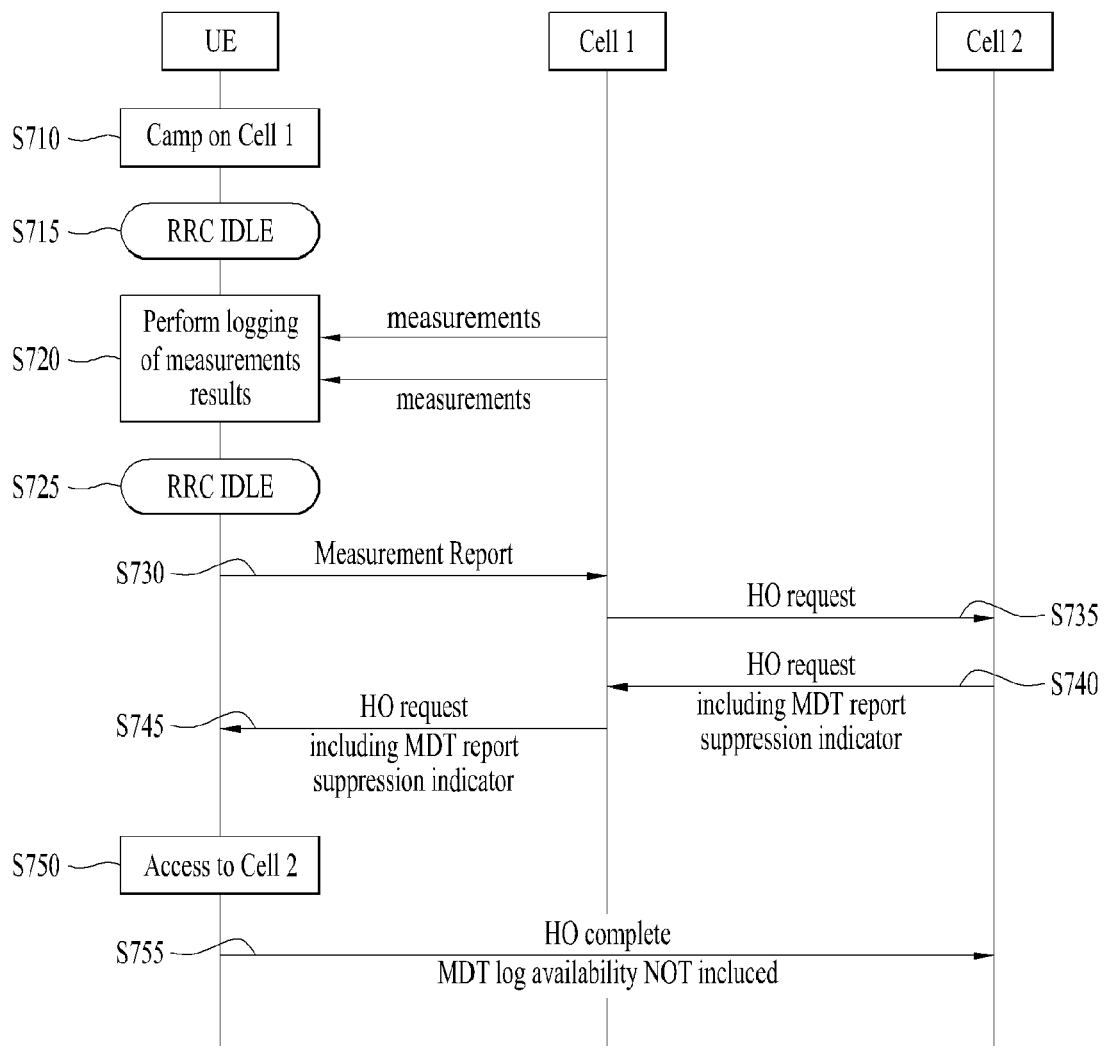
FIG. 7 is a diagram showing an example of reporting a cell quality measurement result to a base station only when a UE receives a handover command message including an indicator indicating that a cell quality measurement result for minimization of drive test (MDT) is received, according to another embodiment of the present invention.

FIG. 7 is a diagram showing an example of reporting a cell quality measurement result for MDT to a target BS only when a UE receives a handover command message including an indicator indicating that the cell quality measurement result for MDT is received, according to another embodiment of the present invention.

In FIG. 7, it is assumed that a cell 1 is a serving BS and a cell 2 is a target BS. In addition, it is assumed that the target BS does not wish to receive the logged quality measurement result for MDT from the UE.

Referring to FIG. 7, first, the UE camps on the cell (S710) and may enter an RRC_IDL state (S715).

The UE performs measurement for MDT and logs a cell quality measurement result (S720).

Thereafter, if RRC connection between the UE and the cell 1 is established (S725), the UE transmits the cell quality measurement result for MDT to the cell 1 (S730).

At this time, the cell 1 may request handover to the cell 2 (S735) and the cell 2 may transmit a second indicator indicating that the logged quality measurement result for MDT is not received while transmitting a handover command to the cell 1 (S740).

The cell 1 may transmit the second indicator to the UE while requesting handover (S745).

When the UE performs a handover operation with the cell 2 and accesses the cell 2 (S750), the UE transmits a handover complete message to the cell 2 and does not inform the cell 2 that the logged cell quality measurement result for MDT is present (S755).

According to the embodiment of the present invention, a method of logging the quality measurement result at the UE and stopping operation of the timer if the UE receives the second message including the second indicator although the timer for holding the logged result has elapsed is provided.

In the present invention, if the handover command message including the second indicator is received from the cell, operation of the timer for deciding the remaining period of the logged quality measurement result is stopped so as to continuously hold the logged quality measurement result, thereby ensuring an opportunity to report the logged quality measurement result.

Further, if the handover command message including the first indicator is received after operation of the timer is stopped, a message indicating that the logged quality measurement result is present is transmitted to the target cell and, at the same time, operation of the timer is resumed.

Hereinafter, according to an aspect of the present invention, a UE and a BS for performing the method of reporting the logged quality measurement result for MDT at the UE in a state in which the cell requests MDT.

Figure 8:
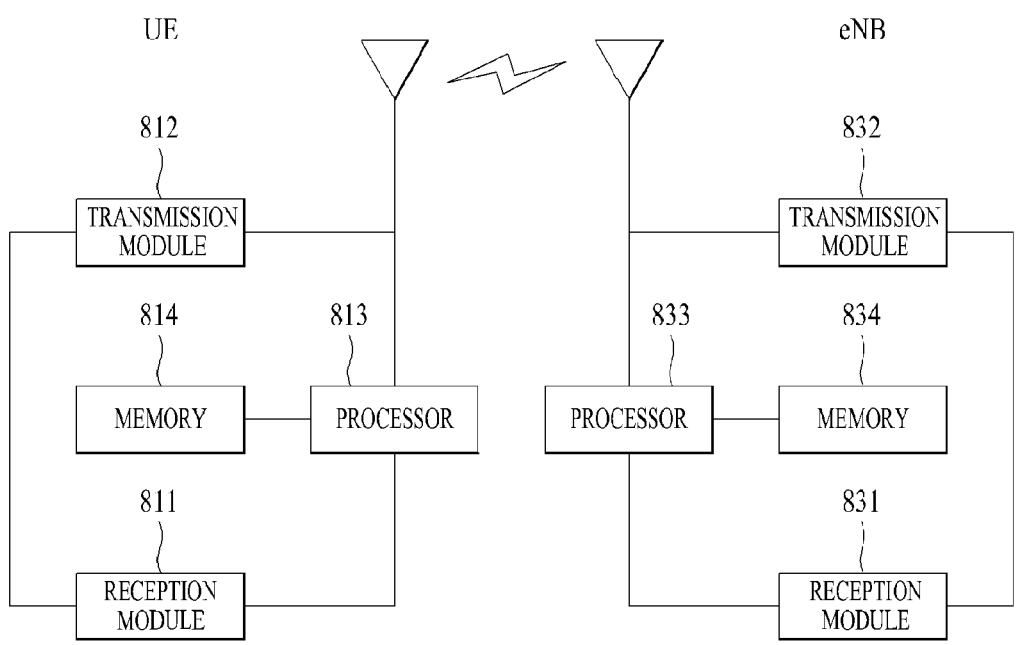
FIG. 8 is a diagram showing the configuration of an embodiment of a wireless communication system including a UE and a BS according to the present invention.

FIG. 8 is a diagram showing the configuration of an embodiment of a wireless communication system including a UE and an eNB (BS) according to the present invention.

The UE may include a reception module 811, a transmission module 812, a processor 813 and a memory 814. The reception module 811 may receive a variety of signals, data, information, etc. from the eNB. The transmission module 812 may transmit a variety of signals, data, information, etc. to the eNB. In addition, the reception module 811 may receive a measurement frequency for MDT or cell reselection information from a network and the measurement frequency for MDT may be received in a state of being in an MDT configuration message. The transmission module 812 may transmit an MDT measurement report message including a cell quality measurement result for MDT according to measurement evaluation. The processor 813 may perform a cell reselection control operation and an MDT measurement control operation. More specifically, the processor 813 may perform serving cell quality measurement, neighboring cell measurement, a determination as to whether cell reselection is performed, etc. The processor 813 may measure the quality of the neighboring cell for MDT. In addition, if a second message including any one of a first indicator indicating that the logged quality measurement result for MDT is received from the BS or a second indicator indicating that the logged quality measurement result is not received is received through the reception module, the processor may control transmission of a message indicating that the logged quality measurement result is present to the BS through the transmission module. Further, the processor 813 may control stoppage of operation of a timer for deciding a period for the logged cell quality measurement result, transmission of a message indicating that the logged quality measurement result is present to the BS through the transmission module if a second message including a first indicator is further received after operation of the timer is stopped, and resumption of the timer.

The eNB may include a reception module 831, a transmission module 832, a processor 833 and a memory 834. The reception module 831 may receive a variety of signals, data, information, etc. from the UE. The transmission module 832 may transmit a variety of signals, data, information, etc. to the UE.

At this time, the processor 833 performs a function for processing information received by the UE, information to be transmitted to an external device, etc., and the memory 834 may store the processed information for a predetermined time and may be replaced with a component such as a buffer (not shown).

The following embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

Although the invention has been described with reference to the exemplary embodiments, those skilled in the art will appreciate that various modifications and variations can be made in the present invention without departing from the spirit or scope of the invention described in the appended claims. Accordingly, the present invention is not limited to the above-described embodiments and the present invention includes all embodiments included in claims.

INDUSTRIAL APPLICABILITY

Although the embodiments of the present invention are applied to a 3GPP LTE mobile communication system for convenience of description, a measurement operation for mobility management of a UE may be used and the same method is applicable to various mobile communication systems which may be simultaneously used by the UE.

The invention claimed is:

1. A method of reporting a quality measurement result for minimization of drive test (MDT) by a user equipment (UE), the method comprising:
    receiving a first message including logging configuration information of the quality measurement result for MDT from a base station (BS);
    performing quality measurement for MDT;
    logging the quality measurement result according to the logging configuration information included in the first message;
    operating a predetermined timer after logging the quality measurement result;
    receiving a second message indicating whether the BS supports reporting of the logged quality measurement result from the BS;
    if the second message indicates that the BS supports reporting of the logged quality measurement result, transmitting, to the BS, a third message indicating that the logged quality measurement result is present; and
    if the second message indicates that the BS does not support reporting of the logged quality measurement result, stopping operation of the predetermined timer; and
    transmitting, to the BS, a fourth message indicating that the logged quality measurement result is present and resuming operation of the predetermined timer, if another second message is received after stopping operation of the predetermined timer, the another second message indicating that the BS supports reporting of the logged quality measurement result.

2. The method according to claim 1, wherein the second message is received via a UE-specific channel.

3. The method according to claim 1, wherein the second message is received via a broadcast channel.

4. The method according to claim 1, further comprising:
    deleting the logged quality measurement result if the predetermined timer has expired.

5. A method of reporting a quality measurement result for minimization of drive test (MDT) by a user equipment (UE), the method comprising:
    receiving a first message including logging configuration information of the quality measurement result for MDT from a serving base station (BS);
    performing quality measurement for MDT;
    logging the quality measurement result according to the logging configuration information included in the first message;
    operating a predetermined first timer after logging the quality measurement result;
    receiving a handover command message indicating whether a target BS supports reporting of the logged quality measurement result from the serving BS;
    if the handover command message indicates that the BS supports reporting of the logged quality measurement result, transmitting, to the target BS, a handover complete message indicating that the logged quality measurement result is present; and
    if the handover command message indicates that the BS does not support reporting of the logged quality measurement result,
        stopping operation of the predetermined timer; and
        transmitting, to the target BS, a second message indicating that the logged quality measurement result is present and resuming operation of the predetermined timer, if another handover command message is received after stopping operation of the predetermined timer, the another handover command message indicating that the target BS supports reporting of the logged quality measurement result.

6. The method according to claim 5, further comprising:
    deleting the logged quality measurement result if the predetermined timer has expired.

7. A user equipment (UE) for reporting a quality measurement result for minimization of drive test (MDT), the UE comprising:
    a reception module;
    a transmission module; and
    a processor configured to:
    perform quality measurement for MDT if a first message including logging configuration information of the quality measurement result for MDT is received from a base station (BS) through the reception module,
    log the quality measurement result according to the logging configuration information included in the first message,
    operate a predetermined timer after logging the quality measurement result,
    receive a second message indicating whether the BS supports reporting of the logged quality measurement result from the BS through the reception module, if the second message indicates that the BS supports reporting of the logged quality measurement result, transmit, to the BS, a third message indicating that the logged quality measurement result is present, and if the second message indicates that the BS does not support reporting of the logged quality measurement result, stop operation of the predetermined timer, and transmit, to the BS, a fourth message indicating that the logged quality measurement result is present and resuming operation of the predetermined timer, if another second message is received after stopping operation of the predetermined timer, the another second message indicating that the BS supports reporting of the logged quality measurement result.

8. The UE according to claim 7, wherein the processor is further configured to delete the logged quality measurement result if the predetermined timer has expired.

9. A user equipment (UE) for reporting a quality measurement result for minimization of drive test (MDT), the UE comprising:

a reception module;

a transmission module; and a processor configured to perform quality measurement for MDT if a first message including logging configuration information of the quality measurement result for MDT is received from a serving base station (BS) through the reception module, log the quality measurement result according to the logging configuration information included in the first message, operate a predetermined first timer after logging the quality measurement result, receive a handover command message indicating whether a target BS supports reporting of the logged quality measurement result from the serving BS through the reception module, if the handover command message indicates that the BS supports reporting of the logged quality measurement result, transmit, to the target BS, a handover complete message indicating that the logged quality measurement result is present through the transmission module, and if the handover command message indicates that the BS does not support reporting of the logged quality measurement result, stop operation of the predetermined timer, and transmit, to the target BS, a second message indicating that the logged quality measurement result is present and resume operation of the predetermined timer, if another handover command message is received after stopping operation of the predetermined timer, the another handover command message indicating that the target BS supports reporting of the logged quality measurement result.

10. The UE according to claim 9, wherein the processor is further configured to delete the logged quality measurement result if the predetermined timer has expired.

* * * * *